United States Patent [19]

Yasuda

[11] Patent Number: 5,012,400
[45] Date of Patent: Apr. 30, 1991

[54] DC/AC POWER CONVERTING APPARATUS INCLUDING DC COMPONENT REMOVER

[75] Inventor: Nobuyuki Yasuda, Tokyo, Japan

[73] Assignee: Kabushiki Kaisha Toshiba, Kawasaki, Japan

[21] Appl. No.: 410,057

[22] Filed: Sep. 21, 1989

[30] Foreign Application Priority Data

Sep. 26, 1988 [JP] Japan .................. 63-238815

[51] Int. Cl.⁵ .................. H02M 07/537; H02M 1/12
[52] U.S. Cl. .................. 363/95; 363/97; 363/39
[58] Field of Search ............ 363/16, 17, 20, 21, 363/24, 25, 26, 39, 40, 41, 95, 98, 97, 131, 132, 133, 134

[56] References Cited

U.S. PATENT DOCUMENTS

| | | | |
|---|---|---|---|
| 4,370,702 | 1/1983 | Shuey et al. | 363/98 X |
| 4,500,837 | 2/1985 | Shuey et al. | 363/97 X |
| 4,739,464 | 4/1988 | Nishihiro et al. | 363/37 |
| 4,803,611 | 2/1989 | Sashida et al. | 363/132 X |
| 4,816,981 | 3/1989 | Nishihiro et al. | 363/37 |
| 4,882,120 | 11/1989 | Roe et al. | 363/98 |
| 4,939,633 | 7/1990 | Rhodes et al. | 363/98 |

FOREIGN PATENT DOCUMENTS 61-199470 9/1986 Japan .

*Primary Examiner*—Steven L. Stephan
*Assistant Examiner*—Emanuel T. Voeltz
*Attorney, Agent, or Firm*—Foley & Lardner

[57] ABSTRACT

In a DC/AC power converting apparatus, a DC component is removed from an AC output. The DC/AC power converting apparatus includes: a DC source for supplying DC power; a DC/AC inverter circuit for inverting the DC power into AC power; a transformer for transforming the AC power to obtain desirable AC power; a detector for detecting an output signal derived from the DC/AC inverter circuit to produce an output detection signal; a calculation circuit for performing a control calculation to enable the output detection signal to follow a reference signal, whereby a first output instruction signal is derived; and, a DC component remover for removing a DC component from the first output instruction signal to derive a second output instruction signal inverting operation of the DC/AC inverter circuit is controlled based upon the second output instruction signal to prevent DC magnetization of the transformer.

8 Claims, 4 Drawing Sheets

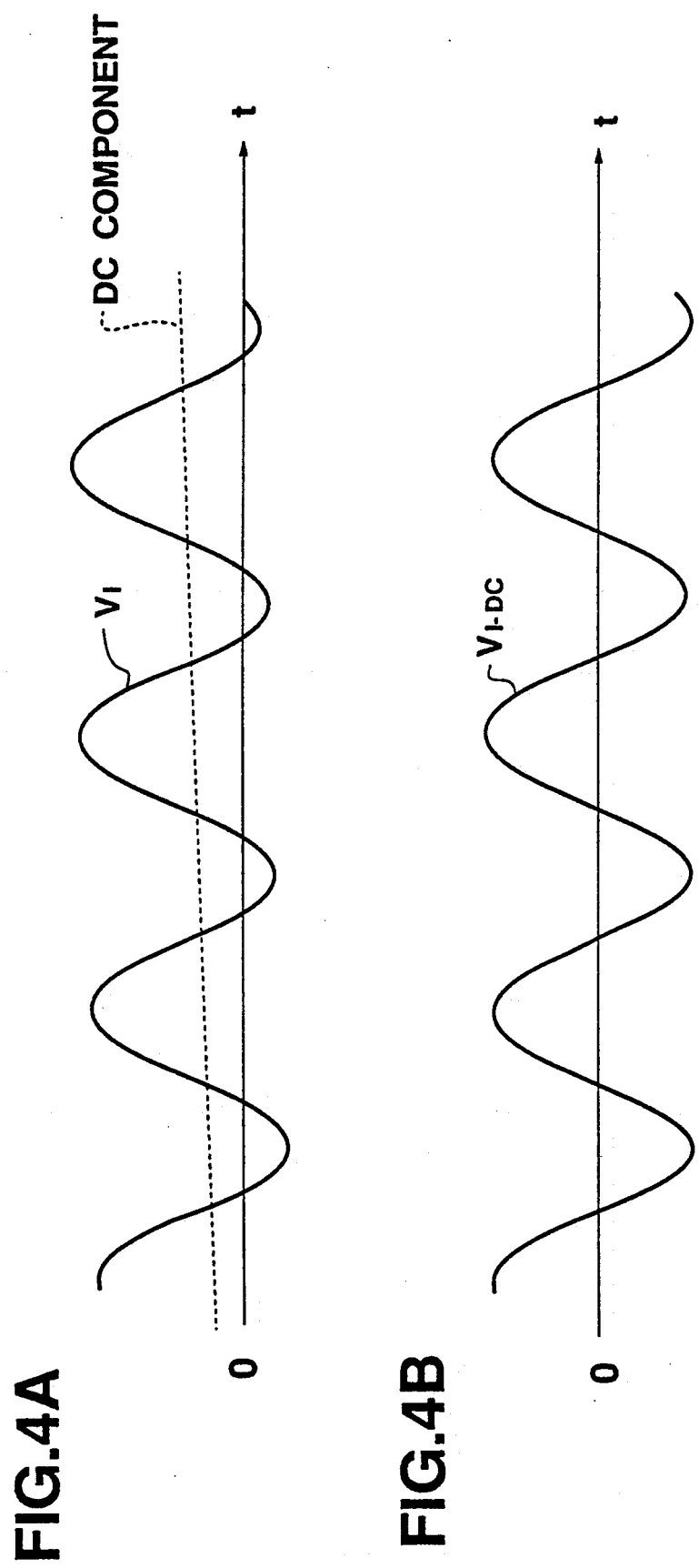

DC/AC POWER CONVERTING APPARATUS INCLUDING DC COMPONENT REMOVER

BACKGROUND OF THE INVENTION

1. Field of the Invention

The present invention generally relates to a DC-to-AC power converting apparatus. More particularly, the present invention is directed to a DC/AC power converting apparatus including either a DC power source, or a DC energy storage element; a DC/AC power inverting circuit; a control circuit for controlling either an output voltage, or an output current of the DC/AC inverter circuit; and also a DC component removing circuit.

2. Description of the Related Art

The DC/AC power converting apparatus set forth in the preamble is known in this field from, for instance, "A SEMICONDUCTOR POWER CONVERTING CIRCUIT" issued on Mar. 31, 1987 from Ohm-sha Co., Ltd. in Japan, FIG. 6.3.53 on page 150.

In FIG. 1, there is shown a conventional DC/AC power converting apparatus. A DC power supply 1 is connected to supply DC power to a DC/AC inverter circuit 2. The DC/AC inverter circuit 2 is arranged by, for instance, a switching transistor, IGBT (insulated-gate bipolar transistor), gate turn-off thyristor (GTO) and the like. AC power produced from this DC/AC inverter circuit 2 is supplied via a transformer 3 to a load, or other power supply systems.

An output current or output voltage of the DC/AC inverter circuit 2 is detected by a current detector 5 such as a current transformer, and supplied as a detected current signal "$i_D$" to a calculation circuit 6. A reference current signal "$i_R$" is also supplied to this calculation circuit 6. In the calculation circuit 6, the detected current signal "$i_D$" is compared with the reference current signal "$i_R$", and a controlling calculation, e.g., a proportional integration is carried out in such a manner that a difference between the detected current signal "$i_D$" and the reference current signal "$i_R$" becomes a small value. As a result, an output instruction signal $V_I$ is produced from this calculation circuit 6 and then supplied to a gate drive circuit 8. The output instruction signal "$V_I$" is converted into a gate signal "$S_g$" in the gate divine circuit 8. Then, the gate signal "$S_g$" is supplied to the DC/AC inverter circuit 2 so that the AC output from the DC/AC inverter circuit 2 follows the above-described reference current value "$i_R$". More specifically, the inverting operation of the DC/AC inverter circuit 2 is controlled based upon this gate signal "$S_g$" in the PWM (pulse width modulation) form.

The above-described current detector 5, and calculation circuit 6 will constitute part of a current, or voltage feedback loop. If a DC component is produced due to a change in offset values in the feedback loop circuit, the AC output of the DC/AC inverter circuit 2 contains DC components. Since the output terminal of this DC/AC inverter circuit 2 is connected to the transformer 3 made of an iron core, the DC components contained in the AC output therefrom may cause DC magnetization of the transformer 3. For instance, the current transfer has the offset value. Moreover, even if the offset adjustment would be effected at the beginning, a drift may occur in the offset value, due to aging offset. As a consequence, a power loss in the transformer 3 is increased, and furthermore noises are produced therein. In the specific conditions, the transformer 3 is saturated so that no power can be supplied to the load 4, or an excessive current output from the DC/AC inverter circuit 2 flows through the output circuit thereof. Accordingly, the performance of the DC/AC inverter circuit 2 may be considerably deteriorated and the reliabilities of the overall DC/AC power converting apparatus may be lowered.

SUMMARY OF THE INVENTION

The present invention has been made in an attempt to solve the above-described problems, and therefore, has an object to provide a highly safe and reliable DC/AC power converting apparatus capable of removing the DC components from the AC output of DC/AC inverter circuit.

To achieve the above-described object, a DC/AC power converting apparatus according to the present invention comprises:

means (1) for supplying DC (direct current) power;

DC-to-AC inverting means (2) for inverting the DC power into AC (alternating current) power;

transformer means (3) for transforming the AC power so as to obtain desirable AC power;

means (5) for detecting an output signal derived from the DC/AC inverting means (2) to produce an output detection signal ($i_D$);

calculating means (6) for performing a control calculation for the DC/AC inverting means (2) so as to enable the output detection signal ($i_D$) to follow a reference signal ($i_R$), thereby deriving a first output instruction signal ($V_I$); and, DC component removing means (50) for removing a DC component from the first output instruction signal ($V_I$) to derive a second output instruction signal ($V_{I-DC}$), whereby the inverting operation of the DC/AC inverting means (2) is controlled based upon the second output instruction signal ($V_{I-DC}$) so as to prevent DC magnetization of the transformer means (3).

Brief Description of the Drawings

For a better understanding of the present invention, reference is made to the following descriptions in conjunction with the accompanying drawings; in which.

DETAILED DESCRIPTION OF THE PREFERRED EMBODIMENTS

Overall Arrangement of DC/AC Power Converting Apparatus

Figure 2:
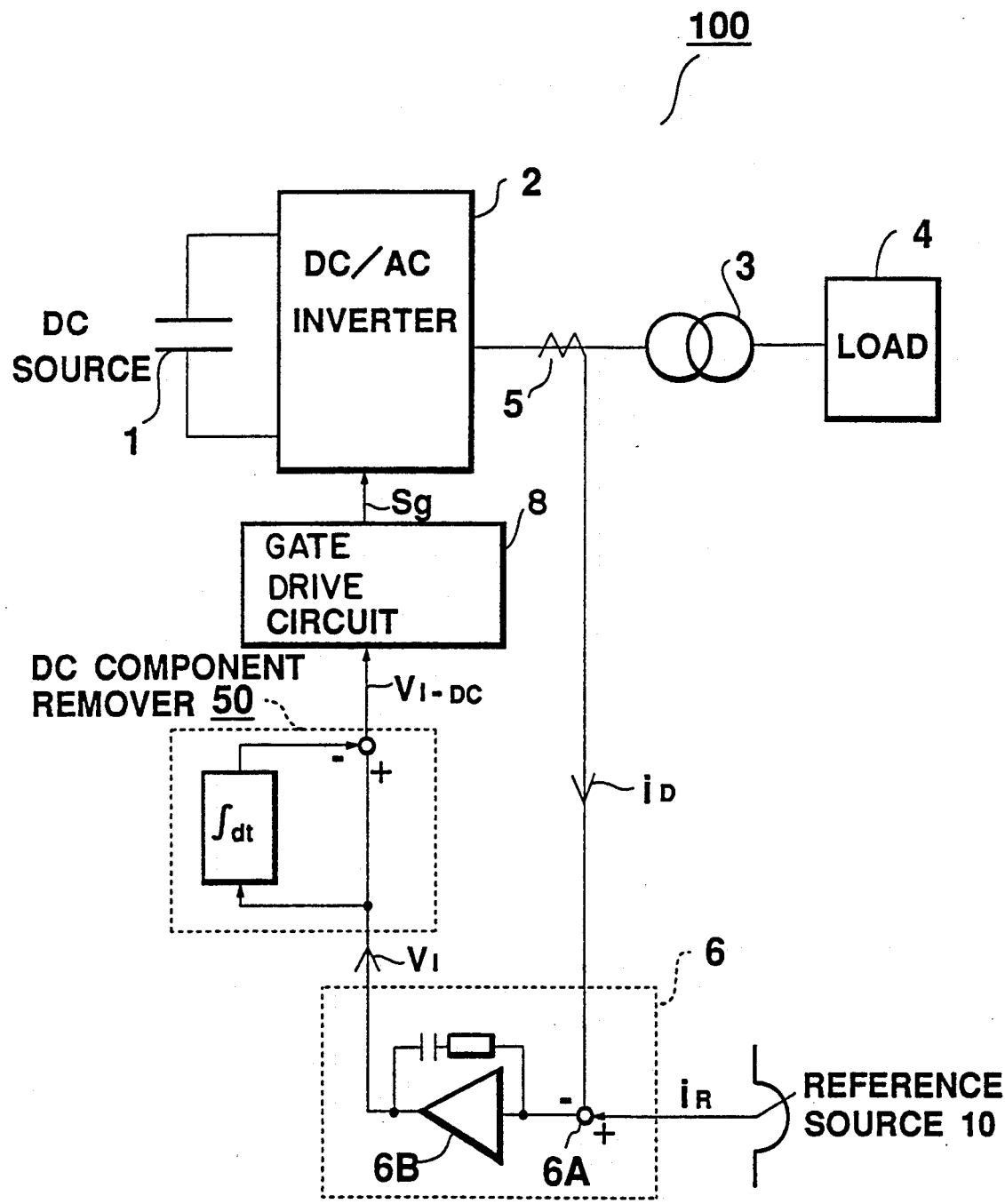
FIG. 2 is a schematic block diagram of a DC/AC power converting apparatus according to a preferred embodiment of the present invention.

In FIG. 2, there is shown an overall circuit arrangement of a DC/AC power converting apparatus 100 according to a preferred embodiment of the invention.

Figure 1:
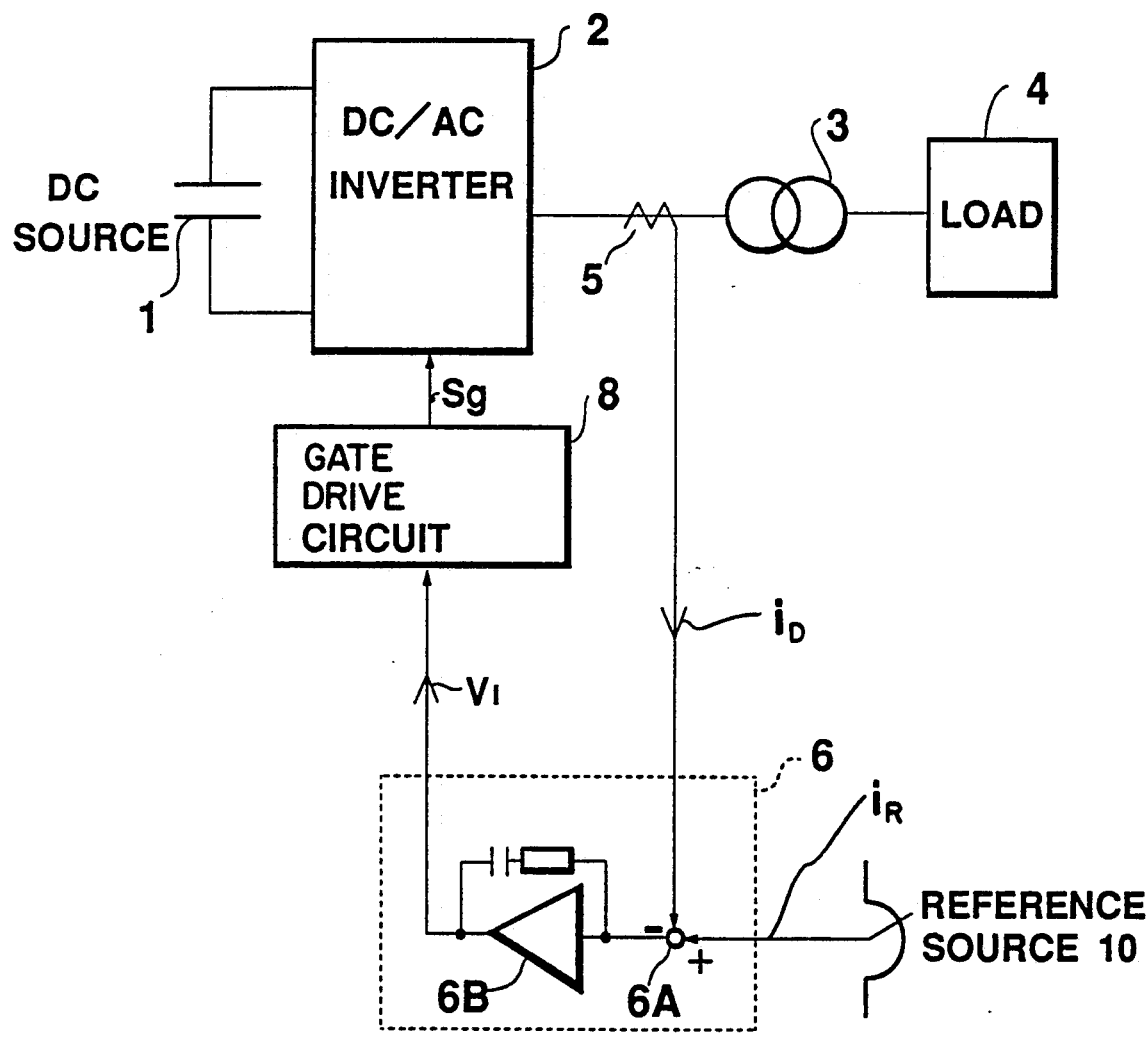
FIG. 1 is a schematic block diagram of a conventional DC/AC power converting apparatus.

It should be noted that the same reference numerals shown in FIG. 1 will be employed for indicating the same components in the following figures.

As shown in FIG. 2, the DC/AC power converting apparatus 100 according to a preferred embodiment includes the DC source 1 such as a battery and a smoothing capacitor of an active filter. The DC source 1 is connected to the DC/AC inverter circuit 2 constructed of, for instance, a GTO (gate turn-off thyristor) and an IGBT (insulated-gate bipolar transistor). The output of the DC/AC inverter circuit 2 is connected to the primary winding (not shown in detail) of the transformer 3 made of an iron core. The secondary winding (not shown in detail) of the transformer 3 is connected to the load 4 (e.g., 10 KVA to 1 MVA). The current detector 5 such as a current transformer capable of detecting not only an AC current but also a DC current is electromagnetically coupled to the power line between the DC/AC inverter circuit 2 and the primary winding of the transformer 3, so as to detect a current detection signal "$i_D$". This current detection signal "$i_D$" is supplied to an adder 6A of the calculation circuit 6. From the reference source 10, the reference current signal "$i_R$" is derived and supplied to this adder 6A. A difference between the current detection signal "$i_D$" and reference current signal "$i_R$" is produced from the adder 6A and then supplied to an integrator 6B. The integrator 6B in the calculation circuit 6 outputs the first output instruction signal "$V_f$". The first output instruction signal "$V_f$ is supplied to a DC component remover 50, whereby the DC component contained in the first output instruction signal "$V_f$" can be removed (will be discussed later). A second, or desirable output instruction signal "$V_{I\text{-}DC}$" from which the DC component has been removed is supplied to the gate drive circuit 8 so as to finally obtain the gate signal for controlling the control gates of the switching elements employed in the DC/AC inverter circuit 2. Thus, these switching elements are controlled in the PWM (pulse width modulation) mode.

DC COMPONENT REMOVER 50

Figure 3:
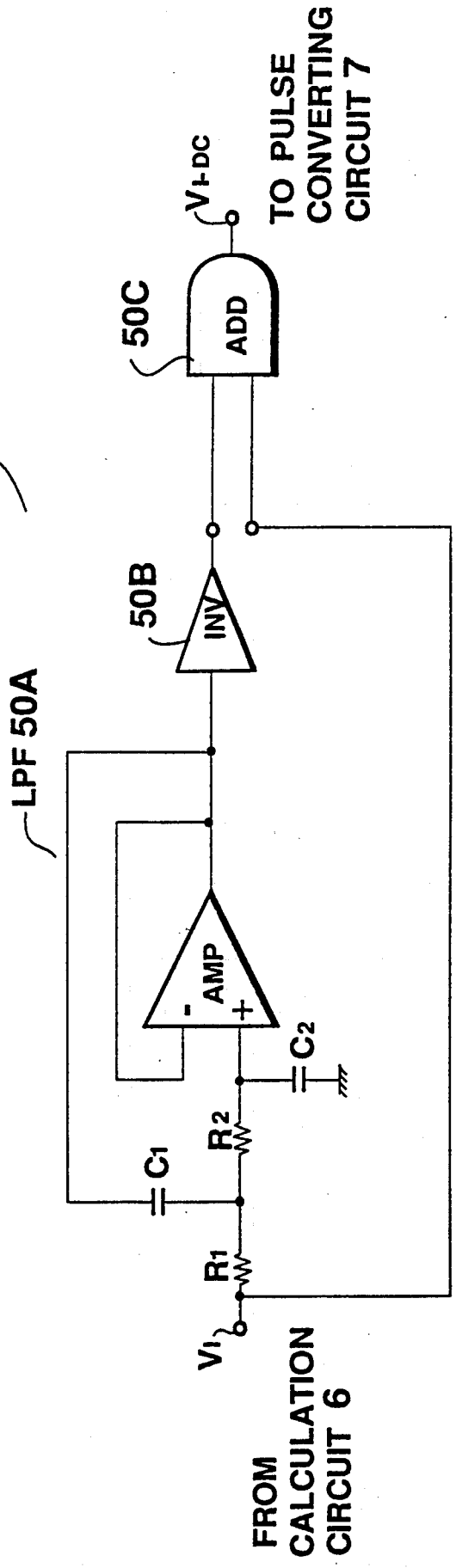
FIG. 3 is a circuit diagram of an internal circuit of the DC component remover 50 shown in FIG. 2; and, FIG. 4 represents waveforms of the output instruction signals.

As a major feature of the preferred embodiment, the DC component remover 50 is newly employed in the current feedback path of the DC/AC power converting apparatus 100. FIG. 3 shows an internal circuit of the DC component remover 50. The DC component remover 50 is mainly constructed of a low-pass filter 50A, an inverter 50B, and an adder 50C. A cut-off frequency of this low-pass filter 50A is selected to be considerably lower than the frequency (e.g., 50 to 60 Hz) of the AC output from the DC/AC inverter circuit 2, for instance, lower than 2 Hz. As a result, if the first output instruction signal "$V_f$" contains the DC component, only this DC component can sufficiently pass through this low-pass filter 50A. Then, the resultant DC component signal is firstly inverted by the inverter 50B and thereafter supplied to one input of the adder 50C. To the other input of this adder 50C, the above-described first output instruction signal "$V_f$" is supplied. Accordingly, the adder 50C can output the second (desirable) output instruction signal "$V_{I\text{-}DC}$" from which the DC component has been completely removed. In other words, the first output instruction signal "$V_f$" containing the DC component is subtracted from the filtered DC component in the adder 50C, so that the desired second output instruction signal "$V_{I\text{-}DC}$" can be finally obtained therefrom.

For a better understanding of this DC component removing operation, a description will now be made with reference to waveforms shown in FIG. 4. FIG. 4A represents both the first output instruction signal "$V_f$" and the DC component contained therein. This DC component is indicated by a dotted line and is gradually increased in accordance with the lapse of time. FIG. 4B represents the desired second output instruction signal "$V_{I\text{-}DC}$" from which the DC component has been completely removed.

With the above-described circuit arrangement, in accordance with the DC/AC power converting apparatus 100, the AC output derived from the the DC/AC inverter circuit 2 contains a longer DC component. As a consequence, since the transformer 3 made of the iron core is no longer DC-magnetized by this DC component, the reliabilities and safety performance of the DC/AC power converting apparatus 100 can be improved.

MODIFICATIONS

The present invention is not limited to the above-described preferred embodiment, but may be modified, changed, and substituted without departing from the technical spirit and scope of the present invention. In the DC component remover 50 shown in FIG. 3, the low-pass filter was constructed of an active element. Alternatively, a passive element such as a capacitor and a resistor may be employed. Furthermore, the first output instruction signal output from the calculation circuit 6 may be integrated so as to derive the DC component therefrom.

Also, in the DC/AC power converting apparatus 100, a current transformer was employed to detect the current flowing through the output line of the DC/AC inverting circuit 2. Alternatively, a potential transformer may be utilized.

In the DC/AC power converting apparatus according to the invention, since the DC component appearing in the voltage feedback loop circuit, e.g., the calculation circuit, can be completely removed by the DC component remover, the AC output from the DC/AC inverter circuit contains no DC component. As a consequence, the transformer is not DC-magnetized by the DC component contained in the AC output, resulting in the higher reliabilities of the DC/AC power converting apparatus.

Also, in accordance with the present invention, the DC component contained in the control signal (i.e., first output instruction signal) for the DC/AC inverting operation can be completely removed, so that the correct DC component removing operation can be accomplished, as compared with a case such that the DC component is removed from the feedback signal, i.e., the current detection signal.

What is claimed is:

1. A power converting apparatus comprising:
   means for supplying DC (direct current) power;
   DC-to-AC inverting means for inverting the DC power into AC (alternating current) power;
   transformer means for transforming the AC power to obtain desirable AC power;
   detecting means for detecting an output signal from the DC-to-AC inverting means to produce an output detection signal;
   calculating means for performing a control calculation for the DC-to-AC inverting means to enable the output detection signal to follow a reference signal by generating a first output instruction signal; and,
   DC component removing means, located in a feedback loop between the calculating means and the DC-to-AC inverting means, for removing a DC component from the first output instruction signal to derive a second output instruction signal such that the inverting operation of the DC-to-AC inverting means is controlled based upon the second output instruction signal to prevent DC magnetization of the transformer means.

2. A power converting apparatus as claimed in claim 1, further comprising:

means for converting the second output instruction signal output from the DC component removing means into a pulsatory gate signal to control the inverting operation of the inverting means.

3. A power converting apparatus as claimed in claim 1, wherein the DC component removing means includes:

a low-pass filter filtering the first output instruction signal to obtain the DC component contained in the first output instruction signal;

an inverter inverting the DC component derived from the low-pass filter to output an inverted DC component; and, an adder adding the inverted DC component to the first output instruction signal to obtain the second output instruction signal.

4. A power converting apparatus as claimed in claim 3, wherein a cutoff frequency of the low-pass filter is selected to be considerably lower than a frequency of the AC power derived from the DC-to-AC inverting means.

5. A power converting apparatus as claimed in claim 4, wherein cutoff frequency of the low-pass filter is approximately 2 Hz and the frequency of the AC power is from 50 to 60 Hz.

6. A power converting apparatus as claimed in claim 1, wherein DC component removing means includes an integrator circuit and a subtracting circuit.

7. A power converting apparatus as claimed in claim 1, wherein the detecting means includes a current transformer.

8. A power converting apparatus as claimed in claim 1, wherein the detecting means includes a potential transformer.

* * * * *